Oct. 4, 1960

L. MILTON ET AL 2,955,179

CONTROL DEVICE

Filed Sept. 26, 1958

INVENTORS
Leonard Milton
John S. Lory

ATTORNEY

Oct. 4, 1960    L. MILTON ET AL    2,955,179
CONTROL DEVICE
Filed Sept. 26, 1958    2 Sheets-Sheet 2

INVENTORS
Leonard Milton
John S. Lory
BY S.C. Yutze
ATTORNEY

United States Patent Office 2,955,179
Patented Oct. 4, 1960

2,955,179
CONTROL DEVICE
Leonard Milton, Lake Success, and John S. Lory, Syosset, N.Y., assignors to The Filtron Company, Inc.
Filed Sept. 26, 1958, Ser. No. 763,521
28 Claims. (Cl. 200—142)

This invention relates to control devices and more particularly to electrical circuit breakers which are responsive to temperature.

Temperature responsive circuit breakers, called thermal circuit breakers, are employed in the electrical arts as protective devices to prevent overheating and burning out of equipment. One of the more common thermal circuit breakers is a fuse. Basically, a fuse comprises a fusible metallic alloy link which bridges a pair of electrical terminals. When the temperature of the alloy reaches a given value, either from excessive ambient temperature or excessive current passing through the link, the metallic alloy melts and the circuit between the terminals is broken. While such fuses are suitable for many non-critical applications, there are situations which require high reliability and precise temperature sensitivity.

There are also many applications, such as aircraft fuel booster pump motors, that require circuit control whenever the ambient temperature of the surrounding environment reaches a given value regardless of the current flowing through the circuit. Accordingly, thermal circuit breakers have been designed which solely sense for rises in ambient temperature. Unfortunately, the proposed devices are usually large, complex and expensive. Often, in spite of their complexity and bulk, the precision of their temperature sensitivity is too coarse and not easily reproducible from unit to unit.

It is accordingly an object of the invention to provide an improved thermal control device.

It is another object of the invention to provide an improved thermal circuit breaker which operates at a precisely prescribed ambient temperature.

It is a further object of the invention to provide an improved control device which will interrupt the line current when the ambient temperature of the surrounding environment reaches a preselected level, independent of the magnitude of the current flow.

It is still a further object of the invention to provide a thermal circuit breaker which is operative over an extremely wide temperature range and has a sensitivity of operation to within one percent of the rated temperature.

It is a general object of the invention to provide a subminiature thermal circuit breaker which, while satisfying the above objects, is light in weight, extremely rugged and durable.

Briefly, in accordance with a general aspect of the invention, a thermal circuit breaker is provided which comprises a pair of electrical terminals. Spring means are included for biasing the electrical terminals in an open-circuited relationship. A rigid member of a material which softens at a predetermined temperature is disposed in operative opposition to the spring means to maintain the electrical terminals in a short-circuited relationship.

In accordance with another aspect of the invention, opposing spring means are provided to minimize chance of damaging the unit during assembly to permit lower tolerances for the various parts with a consequent reduction in cost, and to increase its reliability in operation.

Other objects, features and advantages of the invention will be evident from the following detailed description when read in connection with the accompanying drawings wherein.

Figure 1:
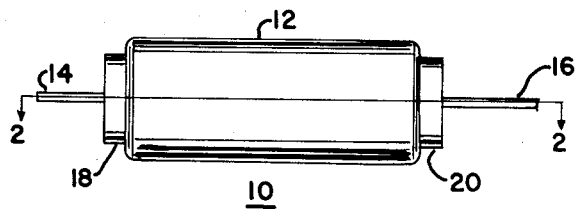
Figure 1 is a side elevation view of a thermal circuit breaker in accordance with one embodiment of the invention.
Figure 2:
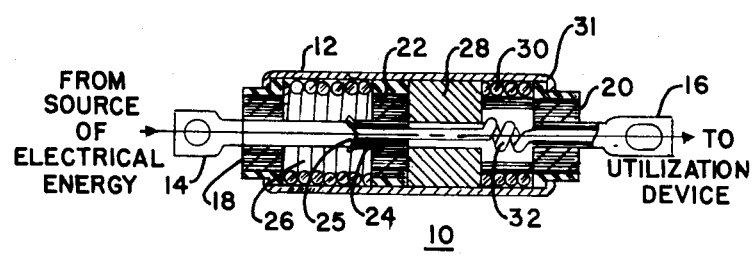
Figure 2 is a sectional view taken along the line 2—2 of Figure 1.

Referring to Figures 1 and 2, a thermal circuit breaker 10 is shown comprising a housing 12 of a thermally conductive metal and a pair of electrical terminals 14 and 16 axially extending through respective end walls 18 and 20 of an insulative material.

A movable piston 22 (Fig. 2) of an insulative material is disposed intermediate the end walls 18 and 20. Extending through the movable piston 22 is an electrical contact 24. The end 25 of electrical contact 24 is cup-shaped to accommodate an end of electrical terminal 14. Interposed between the end wall 18 and the movable piston 22 is a helical spring 26 for urging the movable piston 22 and thereby the electrical contact 24 away from the electrical terminal 14.

A bushing 28 of a relatively rigid non-metallic material, which softens at a predetermined temperature, is positioned against that wall of movable piston 22 which is remote from helical spring 26. Bushing 28 snugly fits within housing 12 but does not impeded the travel of movable piston 22. By way of example, bushing 28 may be composed of α-hydroxy-α-phenylacetophenone which softens at 280° Fahrenheit.

Interposed between bushing 28 and the end wall 20 is a helical spring 30 which acts as a cushioning member to prevent damage to the bushing 28 during assembly, and to permit lower tolerances for the various parts of the circuit breaker 10 at a consequent reduction in cost. It should be noted that helical spring 30 further acts as a contact pressure spring to ensure reliable electrical contact between electrical terminal 14 and electrical contact 24.

Helical spring 30 and bushing 28 cooperate to oppose the forces exerted by helical spring 26 so as to maintain the electrical contact 24 against the electrical terminal 14. A length of stranded wire 32, a portion of which is coiled, connects the electrical contact 24 to the electrical terminal 16. An insulating bushing 31 prevents the short circuiting of stranded wire 32 to helical spring 30.

To assemble the thermal circuit breaker 10, the electrical terminal 14 is fitted in the end wall member 18 to form a sub-assembly. An end of the housing 12 is spun to form an inwardly directed flange. The sub-assembly is positioned in the housing 12. The helical spring 26 is inserted in the housing 12. A second sub-assembly is formed by fitting electrical terminal 16 in end wall member 20. A third sub-assembly is formed by fitting the electrical contact 24 in the movable piston 22. One end of standard wire 32 is soldered to electrical contact 24. Bushing 28 is threaded by stranded wire 32 and positioned against movable piston 22. Helical spring 30 and insulating bushing 31 are then threaded by stranded wire 32 and positioned against bushing 28. The second sub-assembly is connected to the third sub-assembley by threading the other end of stranded wire 32 through the hollow center of electrical terminal 16. A spinning or crimping operation on the housing 12 locks the combined sub-assemblies in position. It should be noted that helical spring 30 acts as a buffer for bushing 28 during this operation. The stranded wire 32 is then soldered to electrical terminal 16 and excess wire is cut off.

Thermal circuit breaker 10 is serially interposed in the electrical circuit to be controlled by soldering the circuit leads to the electrical terminals 14 and 16. In general, the thermal circuit breaker 10 is placed in the region whose ambient temperature is to be sensed. Under normal operating conditions, current flows from the controlled circuit through the electrical terminal 14, the electrical terminal contact 24, the stranded wire 32, and the electrical terminal 16 to the other end of the circuit.

As long as the ambient temperature remains below a specified level, electrical contact 24 is in a short-circuited relationship to electrical terminal 14 and current flows from the source supplying the circuit to a utilization device. However, as soon as the ambient temperature approaches the critical preselected temperature within a fraction of a degree, the bushing 28 begins to soften and helical spring 26 displaces movable piston 24 toward the end wall 20. The connection between electrical terminal 14 and electrical contact 24 is broken and the current flow ceases. Thus, the utilization device cannot be damaged by overheating.

Some of the utilization devices admirably suited for protection by the thermal circuit breaker 10 include aircraft fuel booster pumps, aircraft fuel pump motors, specialized electronic devices such as telemetering equipment, computers, guided missile and rocket circuitry and conventional commercial equipment such as ovens, cookers, air conditioners, refrigerator-defroster units and livestock equipment.

Thermal circuit breakers 10 have been manufactured in forms weighing less than one-fifth of an ounce and having overall dimensions of approximately one and one-third inches in length and approximately one-third of an inch in diameter.

Figure 3:
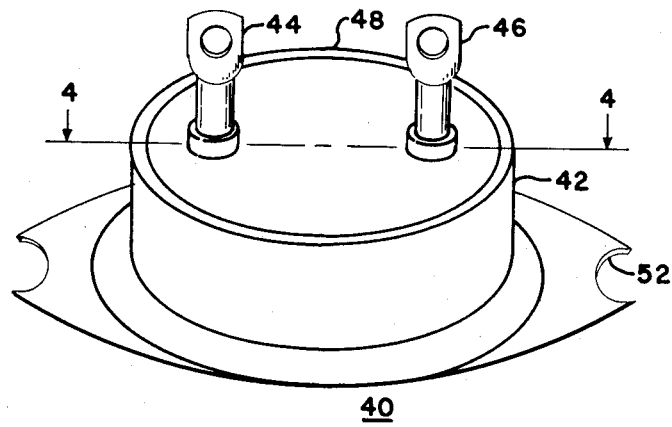
Figure 3 is a perspective view of a thermal circuit breaker in accordance with another embodiment of the invention.
Figure 4:
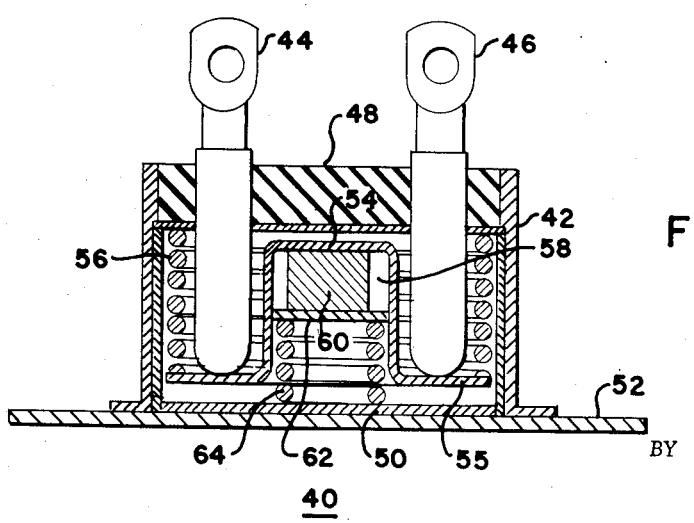
Figure 4 is a sectional view taken along the line 4—4 of Figure 3.

While the thermal circuit breaker 10 is of the cartridge type for direct interposition in a circuit lead, the thermal circuit breaker 40 of Figures 3 and 4 is of the type for direct mounting in a housing. In particular, the thermal circuit breaker 40 comprises a housing 42 connected to a mounting bracket 52, with a pair of electrical terminals 44 and 46 extending through an end wall 48 remote from the mounting bracket 52.

The end wall 48 is of an insulative material. Disposed within the housing 42 intermediate the end wall 48 and the mounting bracket 52 is an electrical contacting member 54 (Fig. 4) of an electrically conductive material. Electrical contacting member 54 is cup-shaped with a peripheral flange 55. Electrical contact member 54 is axially movable to permit the flange 55 to make contact with the ends of the electrical terminals 44 and 46 within the housing 42. Interposed between the end wall 48 and the flange 55 of electrical contacting member 54 is a helical spring 56 to urge the electrical contacting member 54 away from the electrical terminals 44 and 46. It should be noted that the helical spring 56 is electrically separate from the electrical terminals 44 and 46. A pellet 60 of a rigid non-conductive material which softens at a predetermined temperature is disposed within the cup portion 58 of the electrical contacting member 54. A pellet washer 62 is positioned against pellet 60. Interposed between pellet washer 62 and mounting bracket 52 is a helical spring 64 which cooperates with pellet 60 to maintain the flange 55 of electrical contacting member 54 against the ends of the electrical terminals 44 and 46. Helical spring 64 also acts as a cushioning member to prevent damage to the pellet 60 during assembly, and to permit lower tolerances for the various parts of the circuit breaker 40 at a consequent reduction in cost. Helical spring 64 further acts as a pressure contact spring to ensure reliable contact of electrical contacting member 54 with the electrical terminals 44 and 46.

During normal operating conditions, the contact is maintained between electrical contact member 54 and electrical terminals 44 and 46 and a continuous circuit exists between the terminals. However, when the ambient temperature exceeds a predetermined value, pellet 60 softens and helical spring 56 operating on the flange 55 moves electrical contacting member 54 away from the ends of the electrical terminals 44 and 46 to break the circuit.

Figure 5:
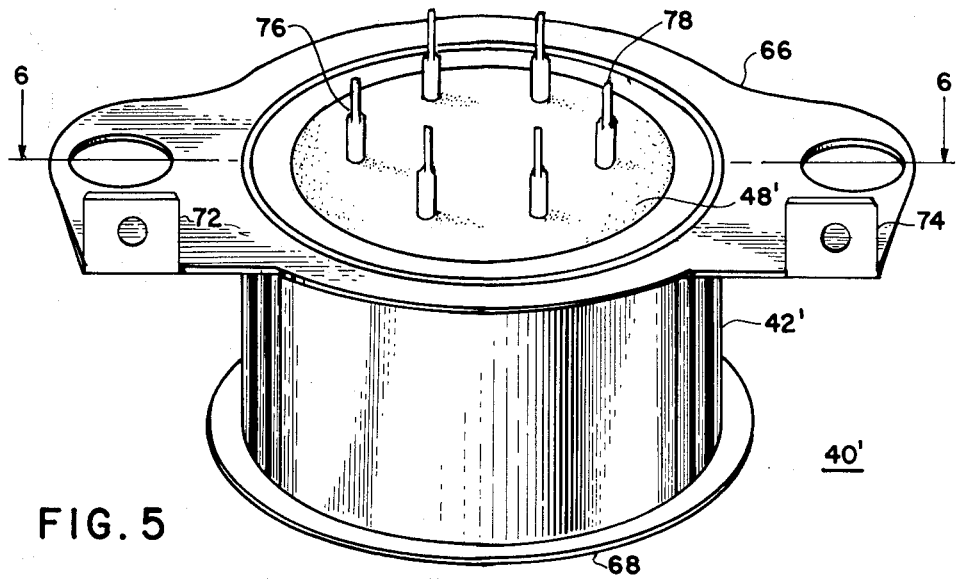
Figure 5 is a perspective view of a thermal circuit breaker in accordance with a further embodiment of the invention.
Figure 6:
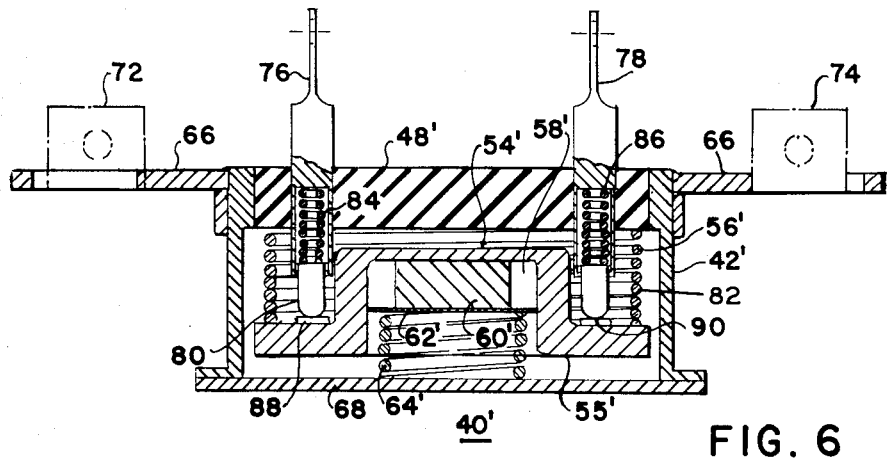
Figure 6 is a sectional view taken along the line 6—6 of Figure 5.

Figures 5 and 6 show an alternate embodiment of the thermal circuit breaker 40 of Figures 3 and 4. Since many of the elements are similar, primed reference characters are employed to designate corresponding elements, and only the differences will be discussed in detail.

The mounting bracket 52 of thermal circuit breaker 40 (Fig. 3) is replaced by an end wall member 68 while a mounting bracket 66 laterally extends from the housing 42' in the region of the end wall member 48'. The mounting bracket 66 is provided with tabs 72 and 74 to permit the mounting of the thermal circuit breaker 40' on its side. A plurality of electrical terminals such as the electrical terminals 76 and 78 extending through the end wall 48' have spring loaded pins 80 and 82 extending from their ends within the housing 42'.

Springs 84 and 86 are disposed respectively within electrical terminals 76 and 78 and operate against the pins 80 and 82 to permit minor variations in length and still ensure good electrical contact.

The portions of the pins 80 and 82 respectively adjacent the springs 84 and 86 have collars with an outside diameter that is greater than the main body portions of the pins 80 and 82. The bases of the terminals 76 and 78 through which the pins 80 and 82 extend have diameters sufficient to pass the main body portions of the pins 80 and 82 but not the collars. Thus, the maximum travel of the pins 80 and 82 is limited. This maximum travel is less than the travel of the electrical contacting member 54'.

Welded to the flange 55' of the electrical contacting member 54' in the regions opposite the pins 80 and 82 are highly conductive contact members 88 and 90 to insure a good electrical connection between the electrical terminals 76 and 78 and the electrical contacting member 54'. The thermal circuit breaker 40' operates in the same manner as the thermal circuit breaker 40 of Figures 3 and 4.

There have thus been shown improved thermal circuit breakers which operate at precisely prescribed ambient temperatures. These circuit breakers interrupt the flow of electrical current when the ambient temperature of the surrounding environment reaches a preselected value independent of the magnitude of the current flow through the associated circuits. Because of the material used in the fusible elements, the circuit breaker is operative over an extremely wide temperature range and has a sensitivity of operation to within less than a degree of the rated temperature.

Not only has there been shown a thermal circuit breaker of the sub-miniature class, but also one that is extremely rugged, reliable and durable.

It will now be obvious to those skilled in the art that many modifications and variations of the described thermal circuit breakers which satisfy some or all of the objects of the invention and accrue many of its advantages, but which do not depart from the invention as defined in the claims which follow.

What is claimed is:

1. A thermal circuit breaker comprising a housing, a first electrical terminal extending axially inward through a first wall of said housing, electrical contacting means disposed in said housing, said electrical contacting means being axially movable, a first spring means axially interposed between said first wall and said electrical contacting means, the portion of said electrical contacting means nearest said first wall being adapted to contact the end of said first electrical terminal, a second electrical terminal extending axially inward through a second wall of said housing, means for electrically connecting said second electrical terminal to the end of said electrical contacting means nearest said second wall, a bushing of a thermally sensitive material, and a second spring means, said bushing and said second spring means being serially interposed between said electrical contacting means and said second wall.

2. A thermal circuit breaker comprising a housing of thermally conductive material, a first electrical terminal fixedly and insulatively extending axially inward through a first wall of said housing, a piston of insulative material disposed in said housing, said piston being axially movable, a first spring means interposed between said first wall and said piston, an electrical contact extending through said piston, the end of said electrical contact nearest said first wall being adapted to contact the end of said first electrical terminal, a second electrical terminal insulatively extending axially inward through a second wall of said housing, flexible means for electrically connecting said second electrical terminal to the end of said electrical contact nearest said second wall, a bushing of a thermally sensitive material, and a second spring means, said brushing and said second spring means being serially interposed between said piston and said second wall.

3. A thermal circuit breaker comprising a housing of thermally conductive material, a first electrical terminal fixedly and insulatively extending axially inward through a first end wall of said housing, a piston of insulative material disposed in said housing, said piston being axially movable, a first helical spring axially interposed between said first end wall and said piston, an electrical contact extending through said piston, the end of said electrical contact nearest said first end wall being adapted to contact the end of said first electrical terminal, a second electrical terminal insulatively extending axially inward through a second end wall of said housing, flexible means for electrically connecting said second electrical terminal to the end of said electrical contact nearest said second end wall, a bushing of a thermally sensitive material, and a second helical spring, said bushing and said second helical spring being serially interposed between said piston and said second end wall.

4. A thermal circuit breaker comprising a housing of thermally conductive material, a first electrical terminal fixedly and insulatively extending axially inward through a first end wall of said housing, a piston of insulative material disposed in said housing, said piston being axially movable, a first helical spring axially interposed between said first end wall and said piston, an electrical contact extending through said piston, the end of said electrical contact nearest said first end wall being adapted to contact the end of said first electrical terminal, a second electrical terminal insulatively extending axially inward through a second end wall of said housing, a length of stranded wire electrically connecting said second electrical terminal to the end of said electrical contact nearest said second end wall, a bushing of a thermally sensitive material, and a second helical spring, said bushing and said second helical spring being serially interposed between said piston and said second end wall.

5. A thermal circuit breaker comprising a first stationary electrical terminal, a piston means, a movable electrical member associated with said piston means, said piston means being operatively disposed with respect to said stationary electrical terminal to permit the contacting of said movable electrical member with said first stationary electrical terminal, a second stationary electrical terminal axially displaced from said first stationary electrical terminal, means for coupling said movable electrical member to said second stationary electrical terminal, a bushing of a temperature sensitive material disposed in the path of travel of said piston means, said bushing being adjacent said piston means, a first spring means operative on said bushing to maintain said electrical terminals in electrical connection, and a second spring means disposed in operative opposition on said piston means to open said electrical connection when said bushing softens at a predetermined temperature.

6. The thermal circuit breaker of claim 5 wherein said first and second spring means are electrically isolated from said electrical terminals.

7. The thermal circuit breaker of claim 5 wherein said bushing is composed of a non-conductive material.

8. The thermal circuit breaker of claim 5 wherein said bushing is essentially composed of α-hydroxy-α-phenylacetophenone.

9. A thermal circuit breaker comprising a stationary electrical terminal, a piston means of insulative material, a second electrical terminal extending through said piston means, said piston means being operatively disposed with respect to said stationary electrical terminal to permit the contacting of said second electrical terminal with said stationary electrical terminal, a bushing of a temperature sensitive material disposed in the path of travel of said piston means, a first spring means operative on said bushing to maintain said electrical terminals in contact, and a second spring means disposed in operative opposition on said piston means to separate said electrical terminals when said bushing softens at a predetermined temperature.

10. The thermal circuit breaker of claim 9 wherein said bushing is composed of a non-conductive material.

11. The thermal circuit breaker of claim 9 wherein said bushing is essentially composed of α-hydroxy-α-phenylacetophenone.

12. A thermal circuit breaker comprising a housing of thermally conductive material, a first electrical terminal fixedly and insulatively extending axially inward through a first end wall of said housing, a piston of insulative material disposed in said housing, said piston being axially movable, a first helical spring axially interposed between said first end wall and said piston, an electrical contact extending through said piston, the end of said electrical contact nearest said first end wall being shaped to accommodate the end of said first electrical terminal, a second electrical terminal insulatively extending axially inward through a second end wall of said housing, a length of stranded wire electrically connecting said second electrical terminal to the end of said electrical contact nearest said second end wall, a bushing of a thermally sensitive material, and a second helical spring, said bushing and said second helical spring being serially interposed between said piston and said second end wall.

13. A thermal circuit breaker comprising a housing of thermally conductive material, a first electrical terminal fixedly and insulatively extending axially inward through a first end wall of said housing, a piston of insulative material disposed in said housing, said piston being axially movable, a first helical spring axially interposed between said first end wall and said piston, an electrical contact extending through said piston, the end of said electrical contact nearest said first end wall being shaped to accommodate the end of said first electrical terminal, a second electrical terminal insulatively extending axially inward through a second end wall of said housing, a length of stranded wire electrically connecting said second electrical terminal to the end of said electrical contact nearest said second end wall, a rigid bushing of a non-conductive material, said rigid bushing softening at a predetermined temperature, and a second helical spring, said second helical spring and said rigid bushing being serially interposed between said piston and said second end wall.

14. The thermal circuit breaker of claim 13 wherein said bushing is essentially composed of α-hydroxy-α-phenylacetophenone.

15. A thermal circuit breaker comprising a housing, a pair of electrical terminals fixedly and insulatively extending inwardly through a wall of said housing, an electrical contacting member in said housing, said contacting member being cup-shaped with laterally extending members, said electrical contacting member being movable to position said laterally extending members against the ends of said electrical terminals, a pellet of a material which softens at a predetermined temperature, said pellet being disposed in the cup portion of said contacting member, a first spring means operative on said pellet for urging said contacting member against said electrical terminals, and a second spring means operative on the laterally extending members of said electrical contacting member to move said electrical contacting member away from said electrical terminals when said pellet softens.

16. A thermal circuit breaker comprising a housing, a pair of electrical terminals fixedly and insulatively extending inwardly through a first wall of said housing, an electrical contacting member in said housing, said contacting member being cup-shaped with a peripheral flange, said electrical contacting member being movable to position said peripheral flange against the ends of said electrical terminals, a pellet of a material which softens at a predetermined temperature, said pellet being disposed in the cup portion of said contacting member, a first spring means interposed between said pellet and a second wall of said housing for urging said contacting member against said electrical terminals, and a second spring means interposed between said first end wall and the peripheral flange of said electrical contacting member to move said electrical contacting member away from said electrical terminals when said pellet softens.

17. A thermal circuit breaker comprising a housing, a pair of electrical terminals fixedly and insulatively extending inwardly through a first end wall of said housing, an electrical contacting member in said housing, said contacting member being cup-shaped with a peripheral flange, said electrical contacting member being movable to position said peripheral flange against the ends of said electrical terminals, a pellet of a material which softens at a predetermined temperature, said pellet being disposed in the cup portion of said contacting member, a first helical spring interposed between said pellet and a second end wall of said housing for urging said contacting member against said electrical terminals, and a second helical spring interposed between said first end wall and the peripheral flange of said electrical contacting member to move said electrical contacting member away from said electrical terminals when said pellet softens.

18. A thermal circuit breaker comprising a housing, a pair of electrical terminals fixedly and insulatively extending inwardly through a first end wall of said housing, an electrical contacting member in said housing, said contacting member being cup-shaped with a peripheral flange, said electrical contacting member being movable to position said peripheral flange against the ends of said electrical terminals, a pellet of a material which softens at a predetermined temperature, said pellet being disposed in the cup portion of said contacting member, a first helical spring interposed between said pellet and a second end wall of said housing for urging said contacting member against said electrical terminals, and a second helical spring interposed between said first end wall and the peripheral flange of said electrical contacting member to move said electrical contacting member away from said electrical terminals when said pellet softens, said second helical spring being electrical isolated from said electrical terminals.

19. A thermal circuit breaker comprising a housing, a pair of electrical terminals fixedly and insulatively extending inwardly through a first end wall of said housing, said electrical terminals being in a spaced parallel relationship, an electrical contacting member in said housing, said contacting member being cup-shaped with a peripheral flange at substantially right angles to said electrical terminals, said electrical contacting member being movable to position said peripheral flange against the ends of said electrical terminals, a pellet of a material which softens at a predetermined temperature, said pellet being disposed in the cup portion of said contacting member, a first helical spring interposed between said pellet and a second end wall of said housing for urging said contacting member against said electrical terminals, and a second helical spring interposed between said first end wall and the peripheral flange of said electrical contacting member, to move said electrical contacting member away from said electrical terminals when said pellet softens, said second helical spring being electrically isolated from said electrical terminals.

20. The thermal circuit breaker of claim 19 wherein said pellet is composed of a non-conductive material.

21. A thermal circuit breaker comprising a housing, a pair of electrical terminals fixedly and insulatively extending inwardly through a first end wall of said housing, said electrical terminals being in a spaced parallel relationship, a pair of spring loaded pins axially extending respectively from the ends of each of said electrical terminals within said housing, an electrical contacting member in said housing, said contacting member being cup-shaped with a peripheral flange at substantially right angles to said electrical terminals, said electrical contacting member being movable to position said peripheral flange against said pair of spring loaded pins, a pellet of a material which softens at a predetermined temperature, said pellet being disposed in the cup portion of said contacting member, a first helical spring interposed between said pellet and the second end wall of said housing for urging said contacting member against said pair of spring loaded pins, and a second helical spring interposed between said first end wall and the peripheral flange of said electrical contacting member to move said electrical contacting member away from said pair of spring loaded pins when said pellet softens, said second helical spring being electrically isolated from said electrical terminals.

22. The thermal circuit breaker of claim 21 wherein said pellet is composed of a non-conductive material.

23. A thermal circuit breaker comprising a first stationary electrical terminal, a piston means of insulative material, a movable electrical member extending through said piston means, said piston means being operatively disposed with respect to said stationary electrical terminal to permit the contacting of said movable electrical member with said first stationary electrical terminal, a second stationary electrical terminal axially displaced from said first stationary electrical terminal, means for coupling said movable electrical member to said second stationary electrical terminal, a bushing of a temperature sensitive material disposed in the path of travel of said piston means, said bushing being adjacent said piston means, a first spring means operative on said bushing to maintain said electrical terminals in electrical connection, and a second spring means disposed in operative opposition on said piston means to open said electrical connection when said bushing softens at a predetermined temperature.

24. The thermal circuit breaker of claim 23 wherein said first and second spring means are electrically isolated from said electrical terminals.

25. The thermal circuit breaker of claim 23 wherein said bushing is composed of a non-conductive material.

26. The thermal circuit breaker of claim 23 wherein said bushing is essentially composed of α-hydroxy-α-phenylacetophenone.

27. A thermal circuit breaker comprising a housing, a pair of electrical terminals fixedly and insulatively extending inwardly through a first end wall of said housing, said electrical terminals being in a spaced parallel relationship, a pair of spring loaded pins axially extending respectively from the ends of each of said electrical terminals within said housing, means for limiting the travel of said spring loaded pins to a predetermined amount, an electrical contacting member in said housing, said contacting member being cup-shaped with a peripheral flange at substantially right angles to said electrical terminals, said electrical contacting member being movable to position said peripheral flange against said pair of spring loaded pins, a pellet of a material which softens at a predetermined temperature, said pellet being disposed in the cup portion of said contacting member, a first helical spring interposed between said pellet and the second end wall of said housing for urging said contacting member against said pair of spring loaded pins, and a second helical spring interposed between said first end wall and the peripheral flange of said electrical contacting member to move said electrical contacting member away from said pair of spring loaded pins when said pellet softens, the travel of said electrical contacting member being greater than said predetermined amount, said second helical spring being electrically isolated from said electrical terminals.

28. The thermal circuit breaker of claim 27 wherein said pellet is composed of a non-conductive material.

References Cited in the file of this patent
UNITED STATES PATENTS

| | | |
|---|---|---|
| 2,203,414 | Knaack | June 4, 1940 |
| 2,411,752 | Padilla | Nov. 26, 1946 |
| 2,415,720 | Angel et al. | Feb. 11, 1947 |
| 2,442,830 | Spracher | June 8, 1948 |
| 2,516,964 | Derby et al. | Aug. 1, 1950 |
| 2,552,331 | Lamb | May 8, 1951 |
| 2,587,506 | Moreland | Feb. 26, 1952 |
| 2,704,797 | Fettweis | Mar. 22, 1955 |
| 2,709,209 | Acker et al. | May 24, 1955 |
| 2,875,298 | Tracy | Feb. 24, 1959 |